Figure 1:
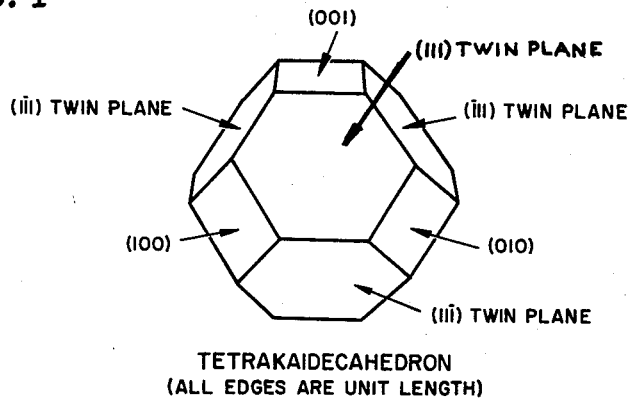

Sept. 8, 1964  R. S. PLOSS  3,148,023
LOW BULK DENSITY CHLORIDE AND THE PROCESS FOR PREPARING SAME
Filed July 15, 1963

TETRAKAIDECAHEDRON
(ALL EDGES ARE UNIT LENGTH)

CYCLIC TWINNED
TETRAKAIDECAHEDRA

INVENTOR.
BY Richard S Ploss

United States Patent Office

3,148,023
Patented Sept. 8, 1964

3,148,023
LOW BULK DENSITY CHLORIDE AND THE
PROCESS FOR PREPARING SAME
Richard S. Ploss, Danvers, Mass., assignor to International Salt Company, Clarks Summit, Pa., a corporation of New Jersey
Filed July 15, 1963, Ser. No. 299,445
8 Claims. (Cl. 23—89)

This invention relates to the production of low bulk density salt, and more particularly to a novel method of producing low bulk density sodium chloride and to the novel product resulting therefrom.

A considerable demand has long existed in industry for low bulk density, flake type sodium chloride crystals. Such crystals have for the most part been produced by evaporation of a saturated brine in large open vessels called grainer pans, crystallization of the salt taking at the brine surface. This method is subject to a number of disadvantages. It is a slow process and, being open to the atmosphere, involves considerable heat loss and contamination of product. Control of product quality and characteristics is difficult. Low bulk density salt is for a number of purposes highly desirable, being relatively resistant to caking, dissolving relatively rapidly in water, and having a high bulking factor as a diluent in admixture with dyestuffs and other substances.

It is an object of this invention to porvide a method for making low bulk density sodium chloride which will be free of one or more of the above disadvantages. Another object of this invention is the provision of a novel, readily controllable, and/or relatively rapid process for producing low bulk density sodium chloride. Still another object of this invention is the provision of such a novel method which can be carried out in vessels closed to the atmosphere, under atmospheric or subatmospheric pressure, and/or in the commonly employed single or multiple effect vacuum evaporators. A further object of this invention is the provision of a novel form of low bulk density sodium chloride. Other objects and advantages will appear as the description proceeds.

The attainment of the above objects is made possible by the present invention, which includes dissolving in a substantially pure saturated aqueous sodium chloride solution about 0.0015 to 0.1% of sodium hexametaphosphate by weight of the solution and about 0.02 to 0.4 part, per part by weight of the sodium hexametaphosphate, of polyvalent metal ion in the form of a water soluble compound thereof, subjecting the resulting solution to evaporation conditions, and recovering the precipitated sodium chloride crystals. It has been found that the process of my invention causes a modification in the crystal habit formation of sodium chloride, apparently by changing the rate of growth of certain lattice layers, whereby formation of cubic and octahedral crystals is suppressed and novel hopper or basket shaped aggregates of tetrakaidecahedral crystals are produced having a desirable low bulk density (low weight/volume ratio) ranging from about 0.5 to 0.9 gram per cc.

The novel sodium chloride crystals produced by the process of this invention are defined as tetrakaidecahedra, in accordance with accepted crystal terminology, as disclosed for example in Dana's Textbook of Mineralogy, 4th edition, 1958, by W. E. Ford, particularly at page 71 etc., Dana's Manual of Mineralogy, 17th edition, 1959, by Hurlbut, particularly at page 105 etc., C. S. Smith's article "Grains, Phases, and Interfaces: An Interpretation of Microstructure," Trans. A.I.M.E., 175 (1948), page 15 etc., particularly at page 47, and Sir William Thompson's (Lord Kelvin) article "On the Division of Space With Minimum Partitional Area," Philo. Mag. 24 (1887), pp. 503–514. The cyclic twinned modification or aggregate results from the fact that the twinning plane of this tetrakaidecahedral crystal is the (111) or flattened cube corner and the final configuration is a hollow, somewhat hemispherical shaped aggregate.

Figure 2:
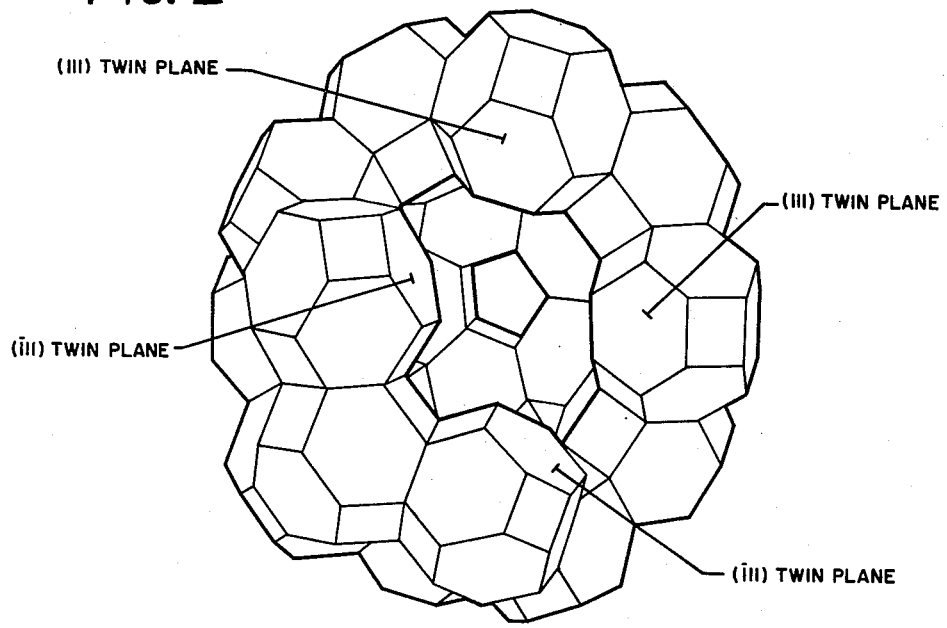

The unit crystal and crystal aggregate structures of the present invention are shown for illustrative purposes in the accompanying drawing, in which:

FIG. 1 is a view in perspective of the unit crystal structure of my invention, and FIG. 2 is a view in perspective of the hollow hopper-shaped crystal aggregate structure of my invention.

As shown in FIG. 1, my novel sodium chloride crystal is a tetrakaidecahedron, a well known stable form of crystal having 14 faces (6 of which are square and 8 of which are symmetrically hexagonal), 24 corners or vertices, and 36 equal edges. It is perhaps best described or visualized as a cube with all 8 corners flattened towards the center of the cube to a depth of ⅔ the original edge length. Each of the 6 square (100) faces of the tetrakaidecahedron is surrounded by 4 hexagonal (111) faces and each of the 8 hexagonal faces is bounded alternately by 3 square and 3 hexagonal faces. In the drawing, the orientations of the faces are marked with the standard Miller indices, the bar above certain digits signifying a negative direction intercept. The (111) faces or flattened corners are, as indicated above, the twinning planes.

FIG. 2 illustrates my hopper-shaped low bulk density sodium chloride crystal aggregate structure, namely the cyclic twinned tetrakaidecahedra formed by cyclic twinning of a plurality of the crystals illustrated in FIG. 1 on their (111) faces.

As indicated above, my process involves formation of a saturated aqueous sodium chloride solution (brine) containing sodium hexametaphosphate and polyvalent metal ion in the stated proportions. Although potassium hexametaphosphate or other alkali metal or alkaline earth metal molecularly dehydrated phosphates are to be regarded as equivalent to sodium hexametaphosphate, the latter is preferred because of its low cost, ready availability and relatively high efficiency for the attainment of the desired results.

As the polyvalent metal ion, aluminum and, somewhat less desirably, ferric ions are preferred because of their relatively high efficiency whereby they may be employed in the lower portion of the above-defined range of proportions, as for example about 0.02 to 0.1 part by weight per part of sodium hexametaphosphate. Other polyvalent metal ions may however be employed, desirably in the upper part of said range of proportions. As examples of such other ions, there may be mentioned barium, boron, bismuth, cadmium, calcium, ceric, cerous, cobaltic, cobaltous, cupric, manganic, manganous, magnesium, nickelous, ferrous, and the like. These ions, or mixtures thereof within the stated proportions, are readily supplied in the brine by dissolution therein of any water soluble compound of the metal, illustratively an oxide, hydroxide, or simple salt such as the sulfate or chloride of the desired polyvalent metal. The resulting solution is subjected to evaporation conditions at a pH of about 4 to 8, preferably about 6 to 7.5. Acidic conditions are of course known as necessary for dissolving some of the above-mentioned polyvalent metal compounds.

The amounts and proportions of the two crystal habit modifying substances present in the brine must be carefully controlled and adjusted to achieve optimum desired results. Thus, as the concentration of the sodium hexametaphosphate in the brine is increased above about 0.01% by weight, the ultimate salt particle size becomes smaller and smaller, so that with a concentration of, say, 0.03 to 0.1%, and with the polyvalent metal ion in proper ratio as described above, the resulting precipitated or crystallized salt will consist of very fine particles with a very low bulk density approaching 0.5 gram per cc. Similarly, if insufficient polyvalent metal ion is present, the salt formed will be octahedral crystals, and cubic crystals if too much polyvalent metal ion is present.

It will of course be understood that the present process may be carried out in grainer pans or other atmospheric conditions. Maximum advantages of the present invention are however obtained when the evaporation of the brine containing the two defined crystal habit modifying substances is carried out by boiling or distilling in a closed vessel, preferably under vacuum or subatmospheric pressures ranging for example from less than 10" to 26" Hg. Standard single or multiple effect vacuum evaporators and procedures may be employed for the evaporation and recovery of the crystallized sodium chloride. The process may be operated batchwise or continuously by using a feed brine supplying the defined amounts of the two crystal habit modifying substances.

The sodium chloride crystals produced in aggregate form by my process have been found to contain, in a configuration as yet not fully understood, residual amounts of the crystal habit modifying substances, i.e. about 100 to 3,000 p.p.m. (parts per million by weight) of sodium hexametaphosphate (calculated from analysis for phosphate, and about 0.5 to 5 p.p.m. of polyvalent metal.

The following example is only illustrative of my invention and is not to be regarded as limitative. All parts and proportions referred to herein and in the appended claims are by weight unless otherwise indicated.

*Example*

A crystallizing run was made in a Monel vacuum evaporator holding 5.5 liters of saturated brine. A draft tube with an impeller in the bottom and appropriate baffles at the top to maintain circulation is built into the apparatus. The brine is heated externally by electric band heaters and a vacuum pump maintains the pressure at 25" Hg throughout the run.

The initial charge of brine (substantially pure saturated aqueous sodium chloride solution) at a pH of 7.0 contained 0.007% of sodium hexametaphosphate and 0.0035% of $Al_2(SO_4)_3 \cdot 18H_2O$ dissolved therein. As the distillation proceeded, a feed brine of the same composition was piped into the evaporator in 100 ml. increments. Whenever 600 ml. of distillate had been collected, which took about 1½ hours, the run was interrupted, the agitation stopped, salt allowed to settle to the bottom where it was drawn off, and the excess brine drawn off with the salt returned to the evaporator and the run resumed. A total of five samples were taken in this manner over an 8 hour period.

The recovered salt, if desired after washing with pure saturated brine to remove adsorbed mother liquor without dissolving the salt and then with 95% alcohol to absorb and expedite evaporation of the remaining moisture, is then dried and screened. It was found to have an average of 60% of +40 mesh material which consisted of almost 100% twinned tetrakaidecahedral (cyclic) crystal aggregates shaped like baskets, and having a bulk density of about 0.7 gram per cc. The —40 mesh increment consisted of small individual combination crystals (cube and octahedron), twinned aggregates of these, and flakes consisting of clear salt as well as flat particles which were formerly walls of the larger aggregates. The salt contained 120 p.p.m. of sodium hexametaphosphate (calculated from analysis for trivalent phosphate), and 1.2 p.p.m. of aluminum (as trivalent aluminum ion).

This invention has been disclosed with respect to certain preferred embodiments and various modifications and variations thereof obvious to persons skilled in the art are intended to be included within the spirit and purview of this invention and the scope of the appended claims. This application is a continuation-in-part of my application Serial No. 100,503, filed April 4, 1961, and now abandoned.

I claim:

1. Sodium chloride having a bulk density of about 0.5 to 0.9 gram per cc. in the form of cyclic twinned tetrakaidecahedral crystals containing about 100 to 3,000 p.p.m. of sodium hexametaphosphate and 0.5 to 5 p.p.m. of polyvalent metal ion selected from the group consisting of aluminum and ferric in the form of a water soluble compound thereof, the twinning plane being (111).

2. Crystals as defined in claim 1 wherein said ion is aluminum.

3. Crystals as defined in claim 1 wherein said ion is ferric.

4. A process for producing cyclic twinned tetrakaidecahedral sodium chloride crystals having a bulk density of about 0.5 to 0.9 gram per cc. comprising dissolving in a saturated substantially pure sodium chloride aqueous solution about 0.0015 to 0.1% of sodium hexametaphosphate and about 0.02 to 0.4 part, per part of sodium hexametaphosphate, of polyvalent metal ion selected from the group consisting of aluminum and ferric in the form of a water soluble compound thereof, subjecting the resulting solution at a pH of about 4 to 8 to evaporation conditions, and recovering the precipitated sodium chloride crystals.

5. A process as defined in claim 4 wherein said ion is aluminum.

6. A process as defined in claim 4 wherein said ion is ferric.

7. A process as defined in claim 4 wherein said evaporation conditions are effected by distillation under vacuum.

8. A process as defined in claim 4 wherein said water soluble compound is aluminum sulfate.

References Cited in the file of this patent

UNITED STATES PATENTS

| | | |
|---|---|---|
| 2,108,783 | Smith | Feb. 15, 1938 |
| 2,906,600 | Roland | Sept. 29, 1959 |